(12) United States Patent
Morimatsu et al.

(10) Patent No.: US 6,563,604 B1
(45) Date of Patent: May 13, 2003

(54) METHOD OF GRADATION REPRODUCTION

(75) Inventors: Hiroyuki Morimatsu, Kurume (JP); Seiichiro Hiratsuka, Kitakyushu (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/323,023

(22) Filed: Jun. 1, 1999

(30) Foreign Application Priority Data

Jun. 1, 1998 (JP) .......................................... 10-150972

(51) Int. Cl.$^7$ ................................................. H04N 1/21
(52) U.S. Cl. ..................................... 358/3.09; 358/3.06
(58) Field of Search ................................ 358/3.09–3.12, 358/1.9, 3.13–3.15

(56) References Cited

U.S. PATENT DOCUMENTS

| | | | | |
|---|---|---|---|---|
| 4,811,108 A | * | 3/1989 | Numakura et al. ............. | 347/3 |
| 5,029,108 A | * | 7/1991 | Lung .......................... | 358/1.9 |
| 5,309,246 A | * | 5/1994 | Barry et al. .................. | 358/1.9 |
| 5,333,069 A | * | 7/1994 | Spence ....................... | 358/517 |
| 5,617,130 A | * | 4/1997 | Uchiyama et al. ........... | 347/131 |
| 5,677,093 A | * | 10/1997 | Delabastita et al. ....... | 358/3.19 |
| 5,737,452 A | * | 4/1998 | Schiller ...................... | 358/3.2 |
| 5,892,588 A | * | 4/1999 | Samworth ................... | 358/1.9 |

FOREIGN PATENT DOCUMENTS

EP        533593 A2 *  3/1993  ............ H04N/1/46

* cited by examiner

Primary Examiner—Thomas D. Lee
Assistant Examiner—Stephen Brinich
(74) Attorney, Agent, or Firm—Parkhurst & Wendel, L.L.P.

(57) ABSTRACT

A method of gradation reproduction including (a) taking image data of a pixel subject to transaction as observing pixel data; (b) weighting the image data with an error diffusion matrix based on an error data calculated on a previously processed neighboring pixel of the observing pixel; (c) obtaining a data of pixel neighboring the observing pixel; (d) calculating a density gradient around the observing pixel from the weighted observing pixel data and the neighboring pixel data, and determining whether or not the pixel lies in an image edge region; (e) determining a dot size by comparing the weighted observing pixel data with a threshold value corresponding to an individual dot size, and selecting a predetermined smaller dot size if the weighted observing pixel data lies in the edge region; (f) producing an output of dot data by taking dot coordinates as a standard position of the observing pixel, if the dot size data is greater than a threshold value for coordinates determination after a comparison between them; and (g) calculating an error data from the observing pixel data, the dot size data and the dot coordinates, and storing it in a storage means for use in a transaction of the succeeding pixel. Repeating the foregoing transaction controls both the dot size and dot coordinates, to realize a method of gradation reproduction that can prevent moire and texture from merging, and maintain fine transaction in the edge region.

2 Claims, 9 Drawing Sheets

PRIOR ART

FIG. 10

|   | * | 7 |
|---|---|---|
| 3 | 5 | 1 |

PRIOR ART

METHOD OF GRADATION REPRODUCTION

FIELD OF THE INVENTION

The present invention relates to a method of gradation reproduction for reproducing gradation of multi-valued color images applicable to printers, image scanners, photocopiers, facsimiles, and the like apparatuses.

BACKGROUND OF THE INVENTION

As one of the methods of gradation reproduction for multi-valued images, there exists now an error diffusion method. FIG. 9 is a block diagram depicting the error diffusion method. In the figure, a multi-valued data "D" of an observing pixel subject to a binarization transaction is read from an image memory 1, and it is γ-corrected into a multi-valued data "D'" suitable for a printing characteristic of an output apparatus such as a printer with reference being made to a corrective data stored in a γ-correction ROM 2. The γ-corrected multi-valued data "D'" is added with an error data "E" for the observing pixel by an adder 3 within an error diffusion device 8, and a data F=D'+E is produced.

In a subsequent comparator 5, the data "F" of the observing pixel, to which the error data "E" is added, is compared with a binarization threshold value "Th". The comparator 5 outputs a binary signal B="1", if the data F≧Th, or a binary signal B="0", if the data F<Th. Based on the above output, a binarization error "E'" for a binarization transaction is calculated as E'=F−B', and it is output by a subtracter 7. In this instance, the value "B'" is derived as B'=B×255, if the input data has a gradation of 256 steps from 0 to 255. Accordingly, when an input multi-valued data "D" and a binarization threshold value "Th" are given as D=230 and Th=128, for instance, an output data "B" after binarization and a binarization error "E'" respectively become as follows:

$$B=1$$

$$E'=F-B\times 255=230-1\times 255=-25.$$

The above binarization error "E'" is stored in an error storage means 4 so that it is distributed to data of pixels being transacted thereafter according to a predetermined error matrix "Mxy" in a weighting error calculator 6. The binarization error "E'" is then added to a multi-valued data of a succeeding pixel by the adder 3, and the error data is transferred. In the above example, in which the input multi-valued data is given as D=230, an error of 25 occurs against the input data of 230, since the value "B'" becomes 255 out of the 256 steps of gradation, because the output data "B" after binarization is 1 as a result of comparison with the binarization threshold value Th=128. Therefore, the error of 25 corresponding to the input D=230 is chosen as the binarization error, and this error is distributed by the weighting error calculator 6 to the error storage unit 4 for unprocessed pixels by using the error matrix, so as to reflect it in the binarizing transaction of the succeeding pixels.

An example of the error matrix "Mxy" is shown in FIG. 10. In FIG. 10, a pixel shown with a mark "*" represents the presently observing pixel, for which a binarizing transaction is made. An error that occurs when this observing pixel is binarized is distributed to the succeeding unprocessed pixels according to weighting factors (7, 1, 5 and 3) shown in the figure. When binarizing the observing pixel marked by the "*", an error distribution value stored in the error storage unit 4 is read, and a succeeding input data read from the image memory 1 is corrected with this error distribution value.

As has been described, the error diffusion method is a means to distribute a binarization error, which occurs when a given pixel is binarized, to the succeeding pixels being binarized, to minimize error of the image data after binarization from the original multi-valued image data.

However, the foregoing transaction has some problems associated with printed images in that their quality degrades after the transaction, such as reduction in graininess and tone reproducibility, degradation in image quality around the edge, emergence of moire, and the like.

SUMMARY OF THE INVENTION

The present invention is intended to solve the above-cited problems, and to provide a means capable of improving graininess, tone reproducibility and image reproducibility in the edge, and elimination of moire in the output images after transaction of tone modulation.

A method of gradation reproduction of the present invention is characterized by controlling both size and density of output dots of a reproduced image, after the gradation process of an input image, by way of varying a number of the output dots, in order to solve the above problems.

During the foregoing transaction of determining size of the output dots, a distinctive character of the input image is extracted, and the dot size is determined based on the extracted character.

Also, the aforementioned character extraction is made for an edge region of the images.

Further, the dots to be output for the region where extraction is made at the edge is made smaller in size than dots for other regions.

In order to realize the foregoing object, the method of gradation reproduction comprises the steps of:

(a) obtaining image data of a pixel subject to transaction, as observing pixel data;

(b) adding weighting data to the observing pixel data, where the weighting data is calculated through a weighting process of error data derived from a previously transacted neighboring pixel of the observing pixel with an error distribution matrix;

(c) obtaining data of a pixel neighboring the observing pixel;

(d) calculating a density gradient around the observing pixel from the observing pixel data and the neighboring pixel data, and determining from the calculated density gradient whether the pixel lies in an edge region of the image;

(e) determining dot size data by comparing the weighted observing pixel data with a threshold value corresponding to an individual dot size, and selecting a predetermined dot size if the weighted observing pixel data lies in the edge region;

(f) producing an output of dot data by determining a dot of the observing pixel as dot coordinates, if the dot size data is greater than the threshold value for coordinates determination by comparing the dot size data with the threshold value; and (g) calculating error data from the observing pixel data, the dot size data and the dot coordinates, and storing it for use as error data in a transaction of the succeeding pixel.

The foregoing method improves reproducibility of gradation, since it varies diameter of the dot in a number of steps. Furthermore, since the method controls coordinates of the dots in a manner to avoid having them arranged side by side along the horizontal and vertical scanning directions, it can prevent moire from emerging.

BRIEF DESCRIPTION OF THE DRAWINGS

FIG. 10 is a diagram depicting an error matrix used in the error diffusion method of the prior art.

DESCRIPTION OF THE PREFERRED EMBODIMENT

Figure 1:
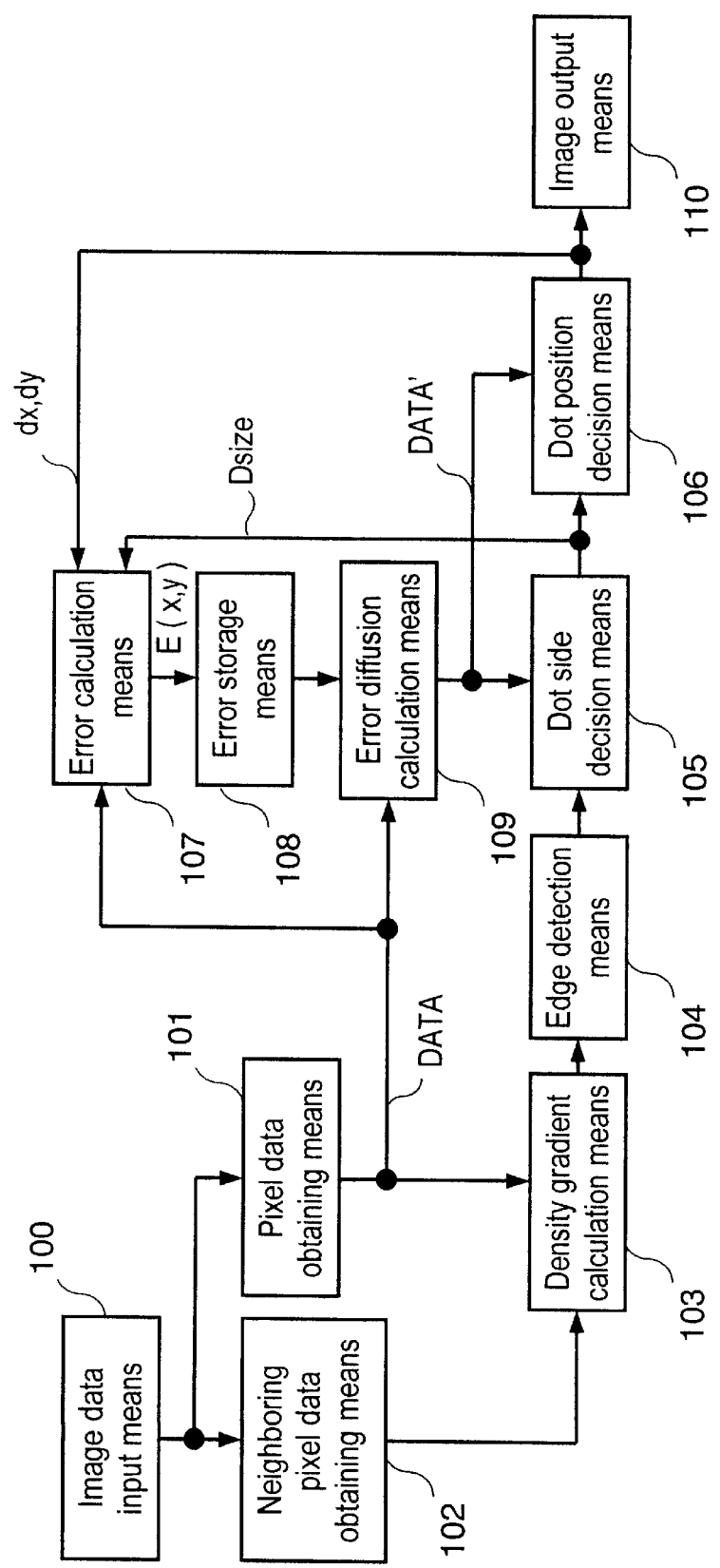
FIG. 1 is a block diagram depicting a structure of an exemplary embodiment of the present invention.

A preferred embodiment of the present invention will be described hereinafter. FIG. 1 is an explanatory diagram for the purpose of describing a transaction process of gradation reproduction in the present exemplary embodiment of this invention.

An image data input means 100 stores data of an input image for which tone modulation is carried out. A pixel data obtaining means 101 takes image data of a pixel subject to the tone modulation transaction out of the image data stored in the image data input means 100, and the taken data is output to a density gradient calculation means 103 and an error diffusion calculation means 109.

A neighboring pixel data obtaining means 102 takes image data of a pixel adjacent the object pixel, of which image data is taken by the pixel data obtaining means 101, and the taken data is output to the density gradient calculation means 103.

The density gradient calculation means 103 calculates a density gradient at the object pixel from the image data of the object pixel taken by the pixel data obtaining means 101 and the image data of the neighboring pixel taken by the neighboring pixel data obtaining means 102.

An edge detection means 104 performs edge detection for the object pixel based on information of the density gradient calculated by the density gradient calculation means 103 at the object pixel, and forwards detected edge information to a dot size decision means 105.

The dot size decision means 105 determines a dot size corresponding to the image according to the edge information output by the edge detection means 104 and the image data output by the error diffusion calculation means 109.

A dot position decision means 106 determines coordinates of the dot, whose dot size is determined by the dot size decision means 105, and it determines coordinates of the dot by referring to the image data output by the error diffusion calculation means 109. An image output means 110 stores a tone modulated image, for which a dot in the dot size output by the dot size decision means 105 is set on the coordinates determined by the dot position decision means 106.

Error calculation means 107 calculates an error in the output image on the coordinates of the dot determined by the dot position decision means 106 by referring to information of the dot size determined by the dot size decision means 105 and the object pixel data obtained by the pixel data obtaining means 101.

The error data calculated by the error calculation means 107 is stored in an error storage means 108, and it is forwarded to the error diffusion calculation means 109. The error diffusion calculation means 109 carries out calculation of an error diffusion by referring to the error data stored in the error storage means 108 and the object pixel data obtained by the pixel data obtaining means 101. The error diffusion calculation means 109 then outputs data, which is derived by weighting on the object pixel data with the error data, to the dot size decision means 105 and the dot position decision means 106.

The foregoing exemplary embodiment of the present invention will be described further by referring to FIG. 1.

First, an image subject to tone modulation is stored in the image data input means 100, in order to carry out a necessary transaction on the input image for its individual raster and pixel, data of the pixel being processed is taken by the pixel data obtaining means 101 from the image data input means 100. Also data of a pixel adjacent the object pixel is taken by the neighboring pixel data obtaining means 102 from the image data input means 100.

Figure 2:
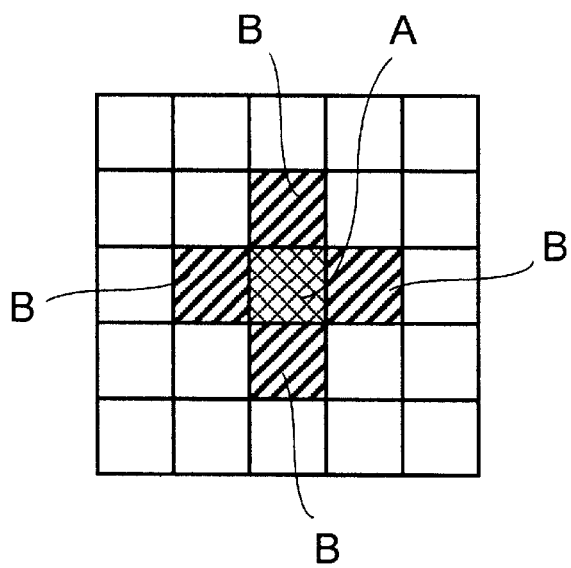
FIG. 2 is a diagram depicting a relation between an observing pixel subject to a transaction of the present invention and neighboring pixels adjacent to it.

FIG. 2 shows a relation between an object pixel data taken by the pixel data obtaining means 101 and pixel data taken by the neighboring pixel data obtaining means 102. The neighboring pixel data of an object pixel "A" consists of four pixels at upper, lower, left and right sides of the object pixel, so that the neighboring pixel data obtaining means 102 obtains image data for these four pixels.

The object pixel data from the pixel data obtaining means 101 and the neighboring pixel data from the neighboring pixel data obtaining means 102 are output to the density gradient calculation means 103, and a density gradient at the object pixel is calculated. Calculation of a density gradient "G" is made to obtain a maximum absolute value of a difference in density between the object pixel data and the neighboring pixel data. In other words, when the object pixel data is represented by "DATA", and the neighboring pixel data on upper, lower, left and right sides are represented respectively by "D_top", "D_bottom", "D_left" and "D_right", then the density gradient "G" is derived by:

$$G=\max (|DATA-D\_top|, |DATA-D\_bottom|, |DATA-D\_left|, |DATA-D\_right|).$$

The density gradient calculation means 103 outputs the foregoing value to the edge detection means 104 as density gradient data of the object pixel.

The edge detection means 104 compares the density gradient data "G" with a threshold value "T" for edge detection, when it receives the density gradient data "G" output by the density gradient calculation means 103. The edge detection means 104 determines that the object pixel is in the edge region if a result of the comparison between the threshold value "T" and the density gradient data "G" is G>T, or that it is not in the edge region if the result is G<T.

That is, it detects the object pixel as being in the edge region if the density gradient data "G", or a maximum value of difference in density between the neighboring pixel data and the object pixel data, calculated by the density gradient calculation means 103, exceeds the predetermined value "T". After detection of an edge region by the edge detection means 104, the edge information is forwarded to the dot size decision means 105 where determination of a dot size of the object pixel is made.

Figure 3:
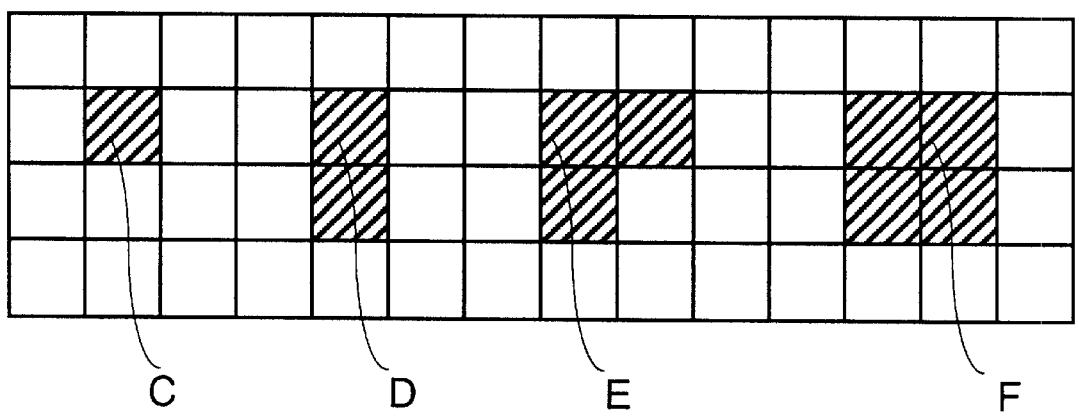
FIG. 3 is a diagram depicting an example of formation pattern of dots for controlling dot size in the present invention.

The dot size decision means 105 determines a dot size based on the edge information output by the edge detection means 104 and a data "DATA'", which is derived by weighting the object pixel data output by the error diffusion calculation means 109 with error data of a previously transacted pixel. FIG. 3 shows an example of dot formation in which dot size is varied by four steps. Reference characters "C", "D", "E" and "F" represent the variation of dot size corresponding respectively to 1 dot, 2 dots, 3 dots and 4 dots.

For instance, if a result of detection obtained by the edge detection means 104 indicates a non-edge region, and a weighted pixel data output by the error diffusion calculation means 109 is 220 in density level in a scale of a lowest density of 0 to a highest density of 255, the dot size decision means 105 outputs the dot size "E", i.e. 3 dots. Or, if the result of detection by the edge detection means 104 indicates an edge region, the dot size decision means 105 outputs a predetermined dot size, i.e. 0 dot, for example in this instance, regardless of a density level of the weighted pixel data output by the error diffusion calculation means 109. Information on the determined dot size is output to the dot position decision means 106 and the error calculation means 107.

The dot position decision means 106 functions in a manner described hereinafter.

The dot position decision means 106 is supplied with the dot size information output by the dot size decision means 105 and the image data "DATA'" weighted on the object pixel data with the error data of a previously processed pixel and output by the error diffusion calculation means 109. The dot position decision means 106 compares the weighted image data "DATA'" input to it with a threshold value "th" for determining dot coordinates, and outputs dot coordinates for a dot of a pixel that satisfies DATA'>th. The dot coordinates data and the dot size information determined here are transferred to the image output means 110, which in turn outputs upon the determined coordinates as a standard position data of a dot in a size corresponding to one of those shown in FIG. 3 according to the dot size information. After the determination of dot coordinates, the error calculation means 107 calculates an error in the object pixel.

The error calculation means 107 is supplied with an object pixel data "DATA" output by the pixel data obtaining means 101, a dot size information "Dsize" (0, 1, 2, 3 and 4 in the case of four step variation) output by the dot size decision means 105, and dot coordinates (dx, dy) output by the dot position decision means 106. An error data "E" (x, y) at the dot coordinates (dx, dy) can be obtained by the following formula:

$$E(x, y)=\text{DATA}-\text{Dsize}\times 255$$

Since the numeric 255 is the density data in an output of one dot, an error data corresponding to the dot size can be stored by adding it to the error data according to a number of the output dots.

Figure 10:
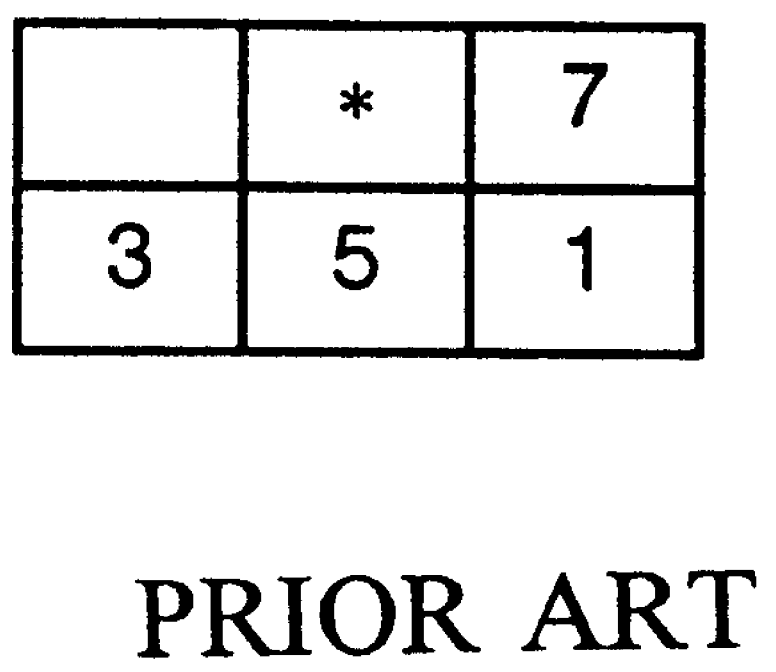

The error data calculated by the error calculation means 107 is transferred to the error storage means 108, and it is stored in a memory corresponding to the dot coordinates determined by the dot position decision means 106. The error data stored in the error storage means 108 is referred to by the error diffusion calculation means 109, when it performs a weighting transaction of the error data for the object pixel. During this transaction, an error matrix similar to the one utilized in the error diffusion as shown in FIG. 10 is applied to the data in the error storage means 108, to weight error data for the neighboring pixels adjacent to the object pixel. The object pixel data "DATA'" that has been weighted and output from the error diffusion calculation means 109 is referred to by the dot size decision means 105 and the dot position decision means 106.

Figure 4:
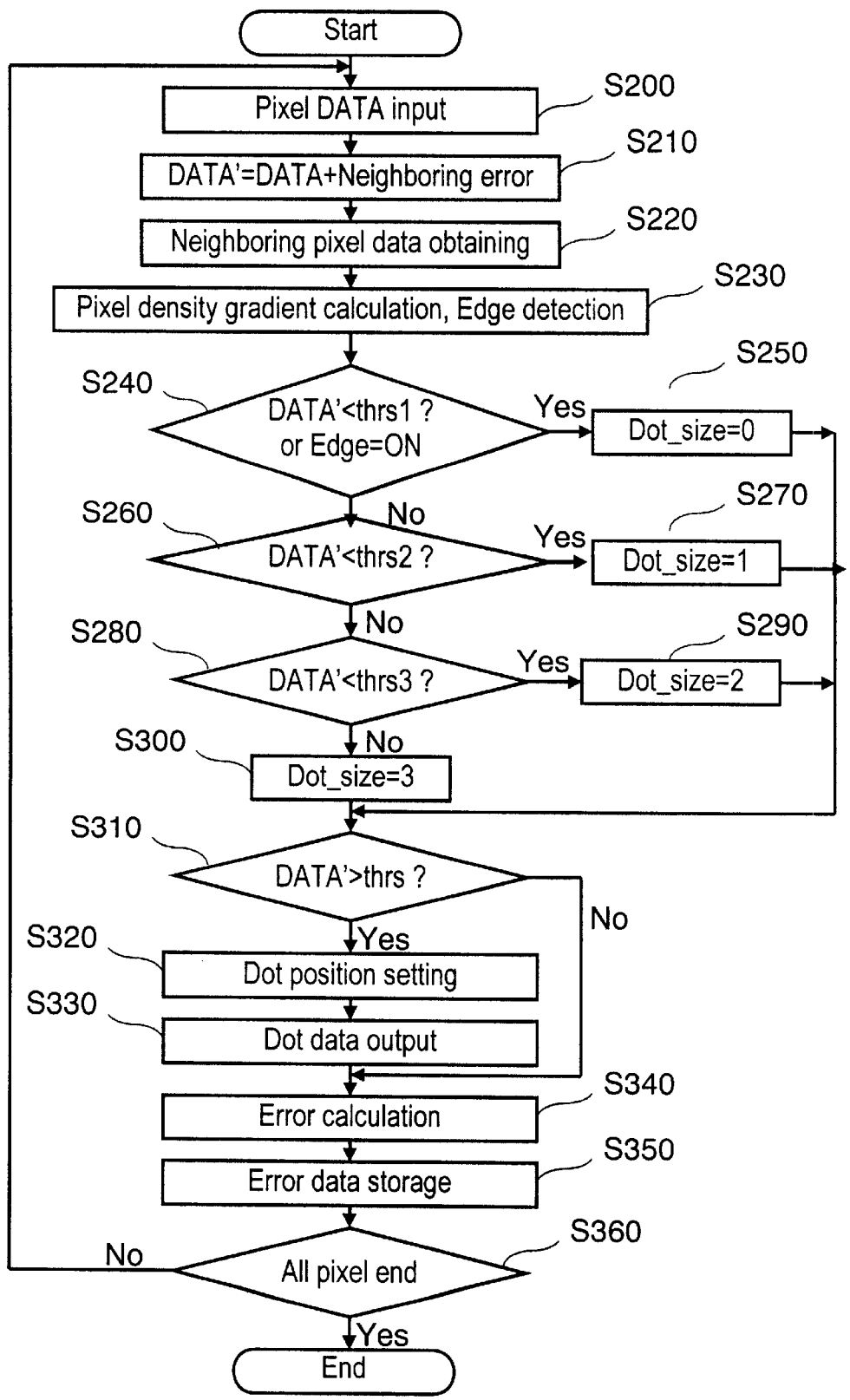
FIG. 4 is a flowchart depicting steps of transaction of the present invention.

The steps of transaction of the present embodiment of this invention will now be described by referring to the flowchart of FIG. 4. In the flowchart, an image data "DATA" of the object pixel being transacted in the image data subject to tone modulation is taken as an observing pixel data (a step S200). The observing pixel data is then weighted with an error diffusion matrix in the error diffusion calculation means 109 based on error data calculated on a previously processed pixel adjacent to the object pixel and stored in the error storage means 108, and a weighted data "DATA'" is calculated (a step S210). The neighboring pixel data obtaining means 102 obtains data of pixels adjacent to the observing pixel (a step S220). The density gradient calculation means 103 calculates a density gradient at and around the observing pixel from the observing pixel data "DATA" and the neighboring pixel data, and the edge detection means 104 determines from the density gradient obtained at the area around the observing pixel whether or not the pixel lies in the edge region. The result is then retained as an edge information "Edge" (ON/OFF) (a step S230).

Next, the dot size decision means 105 compares a threshold value "thrs1" for the dot size of 1 with the "DATA'" (a step S240), and determines a dot size as being 0 if DATA'<thrs1 (a step S250). Or, if Edge=ON in the step S240, the observing pixel is determined to be in the edge region, and the dot size is set as 0 in the step 250. And, if DATA'>thrs 1 in the step S240, it then compares the "DATA'" with a threshold value "thrs 2" for the dot size of 2, if DATA'>thrs 1 (a step S260), and determines the dot size to be 1, if DATA'<thrs 2 (a step S270). If DATA'>thrs 2 in the step S260, the "DATA'" is again compared with a threshold value "thrs 3" for the dot size of 3 (a step S280). If DATA'<thrs 3, the dot size is set as 2 (a step S290). If DATA'>thrs 3 in the step S280, the dot size is set as 3 (a step S300).

After the dot size is determined in this manner, the dot position decision means 106 compares the "DATA'" and the threshold value "thrs" for determining coordinates (a step 310). When DATA'>thrs is satisfied, the observing pixel is taken as the dot coordinates (a step 320), and the dot data is output to the image output means 110 according to the dot size (a step 330).

Following the above output of dot data, the error calculation means 107 calculates an error data on the basis of the "DATA" and the dot size "Dsize" (a step 340). The calculated error data is stored in the error storage means 108 (a step 350), and it is used as an error data in the weighting transaction of a subsequent pixel. The gradation reproduction process is thus carried out by performing the foregoing steps on all pixels of the input image.

Results of the foregoing operation according to the present embodiment of this invention are shown in the accompanying figures.

Figure 5:
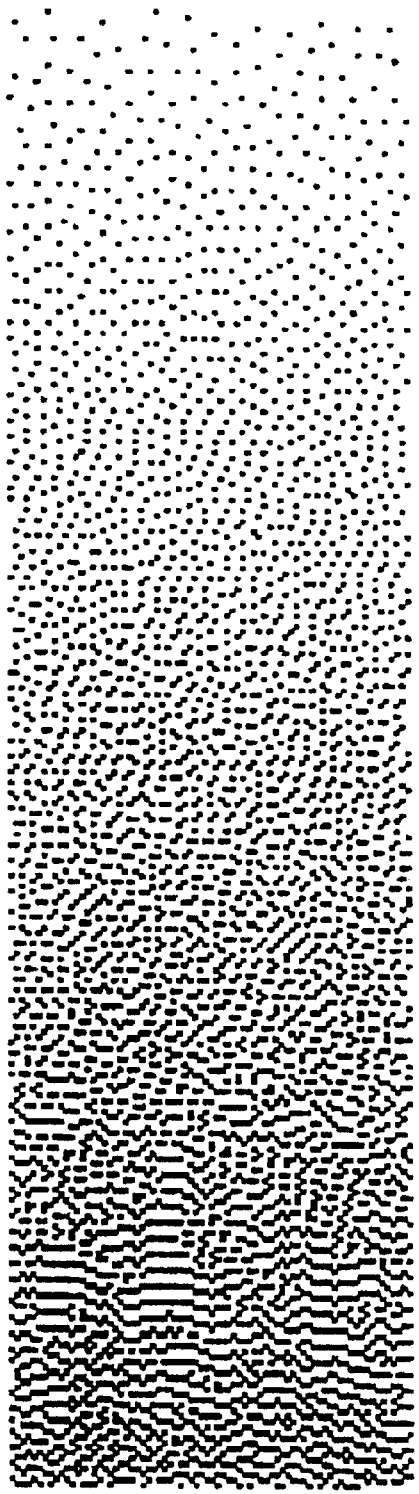
FIG. 5 is a dot pattern showing a result obtained by an error diffusion method of the prior art.
Figure 6:
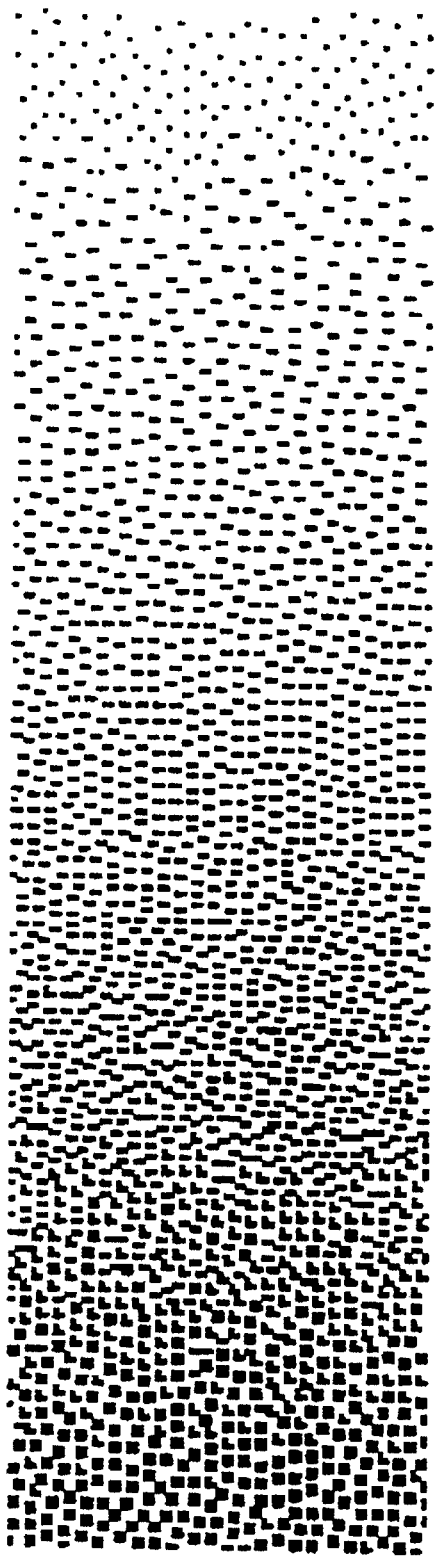
FIG. 6 is a dot pattern showing a result obtained by a method of the present invention.

FIG. 5 depicts a result of binarization with an error diffusion method of the prior art, and FIG. 6 depicts a result of a transaction made by the method of this invention. Dots in FIG. 6 show variations in their size in proportion to the image density, and moire in FIG. 6 is less obvious than that of FIG. 5, thereby realizing a steady reproduction of gradation.

Figure 7:
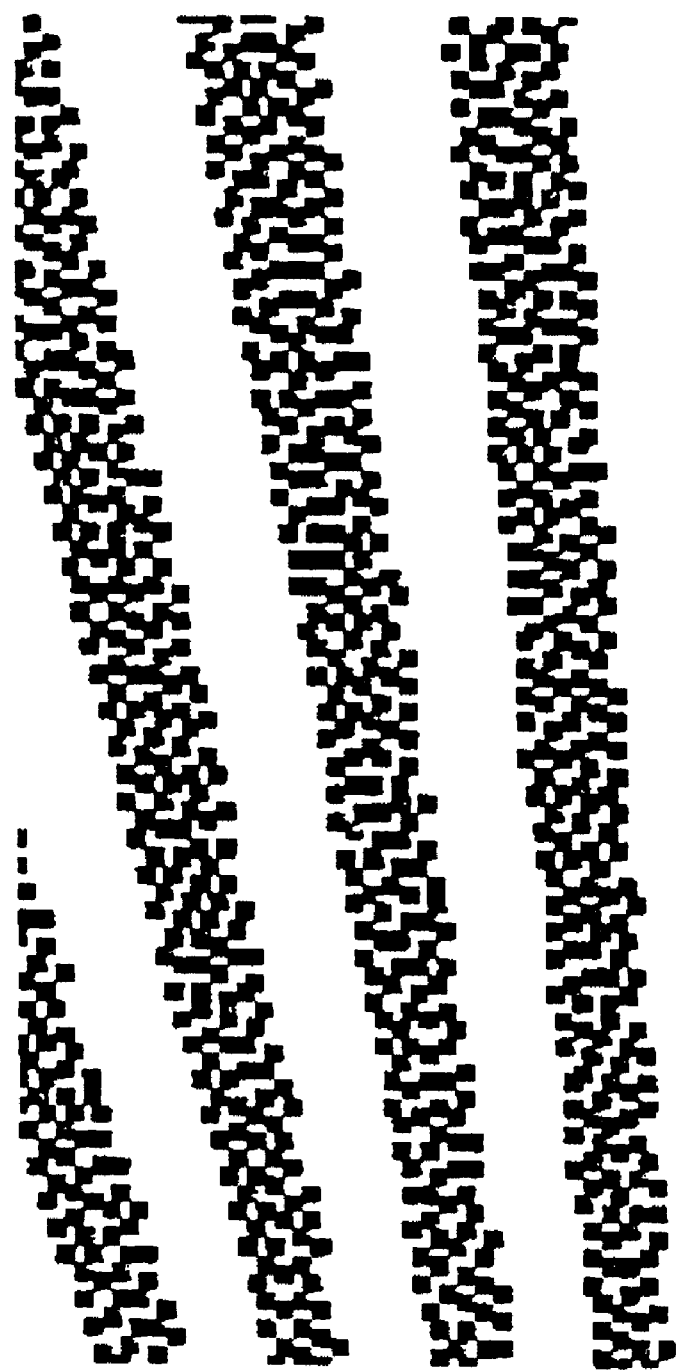
FIG. 7 is a dot pattern showing a result obtained in the present invention not including a transaction on an edge region.
Figure 8:
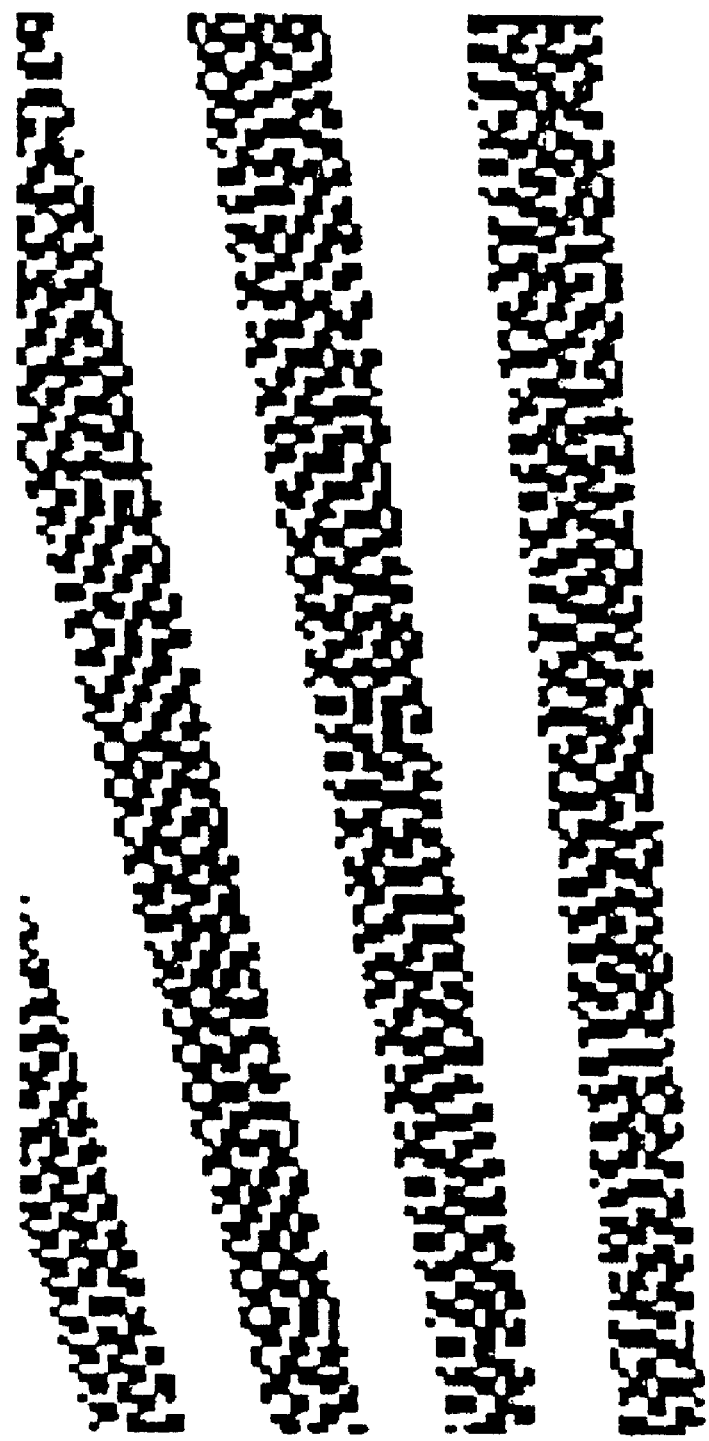
FIG. 8 is a dot pattern showing a result obtained in the present invention including a transaction on the edge region.
Figure 9:
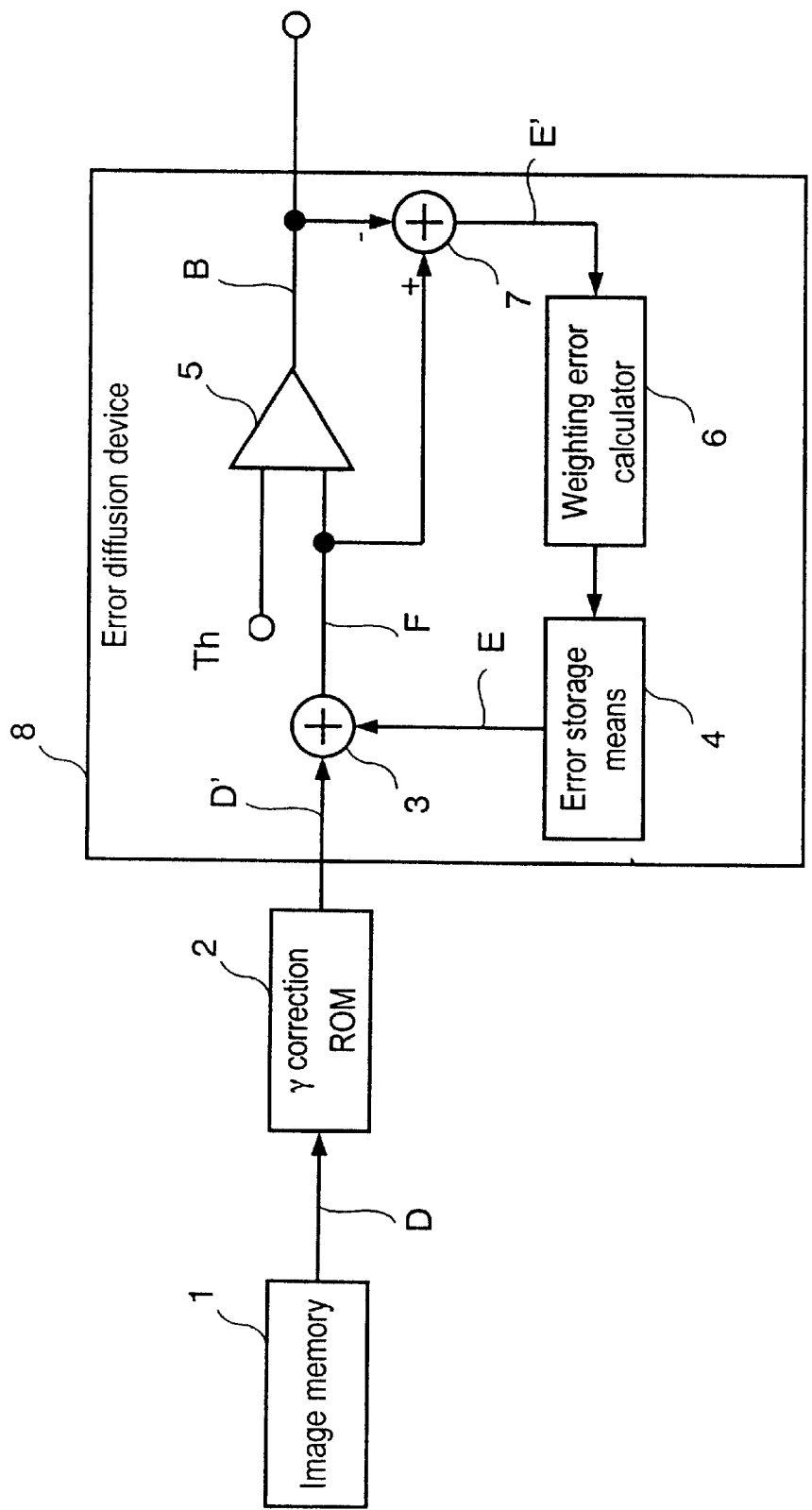
FIG. 9 is a block diagram depicting a process of binarization in the error diffusion method of the prior art.

The embodied method also improves reproducibility in the edge region, since it detects pixels in the edge to output dots in reduced size in the edge region. FIG. 7 shows a result of dots that have been transacted without including detection of the edge pixels, and FIG. 8 shows dots, a part of which in the edge region have been reduced in size by detecting the fringe or edge region. The dots in the edge region have been formed more smoothly in FIG. 8, and reproducibility in the edge region is improved as compared with those that have not been transacted.

As has been described, the present invention realizes a higher reproducibility of gradation as compared to the error diffusion method of the prior art, by controlling both dot size and dot coordinates in the process of tone modulation for the gradation reproduction of images. The embodied method can improve reproducibility of gradation as well as printing quality, if it is applied to an electronic photo-printer, which is not capable of printing individual dots steadily. Moreover, the new method is effective in preventing moire and texture, since it controls both of dot size and the dot coordinates, which eliminates a periodicity of dots in the output images. It can also improve reproducibility in the fringe region, because it produces dots in reduced size for the fringe region by detecting pixels in the fringe.

This invention may be practiced or embodied in still other ways without departing from the spirit or essential characteristics thereof. The preferred embodiment herein described is illustrative and not restrictive. For instance, while the described embodiment illustrates the case in which dot size is set to vary between 1 and 3 dots, the number of dots can be increased. Also, the described method can be realized with hardware, software of a computer, or a combination of them.

What is claimed is:

1. A method of gradation production for reproducing gradation of an input image with dots, said method comprising the steps of:

controlling variations in the size of a number of dots in an output image, and controlling variations in the density of said number of dots in the output image, wherein when an extraction portion comprising a fringe region of the input image is analyzed, said dot size in the output image is determined according to the analyzed extraction portion, and further wherein dots smaller in size are output for an analyzed extraction portion from a fringe region, than dots for areas other than a fringe region.

2. A method of gradation reproduction for reproducing gradation of an input image with dots, said method of gradation reproduction comprising:

(a) obtaining an image data of an observing pixel subject to transaction, as observing pixel data;

(b) adding data to said observing pixel data, weighting data being calculated through a weighting process of error data derived from a previously transacted neighboring pixel of said observing pixel with an error diffusion matrix;

(c) obtaining data of a pixel neighboring said observing pixel;

(d) calculating a density gradient around said observing pixel from said weighted observing pixel data and said neighboring pixel data, and determining from said density gradient whether said pixel lies in a fringe region;

(e) determining dot size, data by comparing said weighted observing pixel data with a threshold value corresponding to an individual dot size, and selecting a predetermined dot size if said weighted observing pixel data lies in said fringe region;

(f) producing output dot data by determining a dot of said observing pixel as dot coordinates, if said dot size data is greater than a threshold value for coordinates determination, by comparing said dot size data with said threshold value; and (g) calculating error data from said observing pixel data, said dot size data and said dot coordinates, and storing said error data for use as an error data in a transaction of a succeeding pixel.

* * * * *